(12) United States Patent
Nozaki

(10) Patent No.: US 9,187,082 B2
(45) Date of Patent: Nov. 17, 2015

(54) CONTROL DEVICE FOR VEHICLE

(75) Inventor: Takeshi Nozaki, Toyota (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 13/982,350

(22) PCT Filed: Feb. 2, 2011

(86) PCT No.: PCT/JP2011/052109
§ 371 (c)(1),
(2), (4) Date: Jul. 29, 2013

(87) PCT Pub. No.: WO2012/105005
PCT Pub. Date: Aug. 9, 2012

(65) Prior Publication Data
US 2013/0311023 A1  Nov. 21, 2013

(51) Int. Cl.
| | | |
|---|---|---|
| B60W 10/06 | (2006.01) | |
| B60W 10/08 | (2006.01) | |
| B60W 10/18 | (2012.01) | |
| B60W 10/20 | (2006.01) | |
| B60W 10/02 | (2006.01) | |
| B60W 10/105 | (2012.01) | |
| B60W 20/00 | (2006.01) | |
| B60K 6/365 | (2007.10) | |
| B60K 6/445 | (2007.10) | |
| H02J 7/32 | (2006.01) | |
| B60W 10/26 | (2006.01) | |
| H02J 7/00 | (2006.01) | |
| B60K 6/34 | (2007.10) | |

(52) U.S. Cl.
CPC ............. *B60W 10/20* (2013.01); *B60K 6/34* (2013.01); *B60K 6/365* (2013.01); *B60K 6/445* (2013.01); *B60W 10/06* (2013.01); *B60W 10/08* (2013.01); *B60W 10/105* (2013.01); *B60W 10/18* (2013.01); *B60W 10/26* (2013.01); *B60W 20/00* (2013.01); *B60W 20/50* (2013.01); *H02J 7/0032* (2013.01); *B60W 2520/04* (2013.01); *Y02T 10/6239* (2013.01); *Y10S 903/93* (2013.01)

(58) Field of Classification Search
CPC ......... B60L 3/0023; B60L 3/04; B60K 6/365; B60K 6/445; B60K 6/34; B60W 10/105; B60W 10/06; B60W 10/08; B60W 10/18; B60W 10/20; B60W 10/26; B60W 10/50; H02J 7/0032
USPC .............................................. 701/22, 36, 41
See application file for complete search history.

(56) References Cited

U.S. PATENT DOCUMENTS

| | | | | |
|---|---|---|---|---|
| 2010/0004833 | A1* | 1/2010 | Nozaki et al. | 701/58 |
| 2010/0081539 | A1* | 4/2010 | Endo et al. | 477/3 |
| 2012/0072065 | A1* | 3/2012 | Minamikawa et al. | 701/22 |

FOREIGN PATENT DOCUMENTS

| | | | |
|---|---|---|---|
| JP | 2000/156909 | * | 6/2000 |
| JP | 2000156909 A | | 6/2000 |

(Continued)

*Primary Examiner* — Fadey Jabr
*Assistant Examiner* — Aaron L Troost
(74) *Attorney, Agent, or Firm* — Kenyon & Kenyon LLP

(57) ABSTRACT

At a hybrid vehicle including a driving power generation device with an engine, a first MG (motor generator) and a second MG, and a transmission device including a power split mechanism coupling an output shaft to the engine and the first MG, and a transmission coupling an output shaft to the second MG, an ECU stops the driving power generation device when the transmission device is in error. Then, the ECU determines whether the vehicle is actually stopped or not based on a detection value from a wheel speed sensor, and maintains the supply of electric power from the battery until a determination is made that the vehicle has actually stopped.

6 Claims, 6 Drawing Sheets

(56) References Cited

FOREIGN PATENT DOCUMENTS

| JP | 2001-206088 A | | 7/2001 |
| JP | 2002-225578 A | | 8/2002 |
| JP | 2005-313865 A | | 11/2005 |
| JP | 2006-220225 A | | 8/2006 |
| JP | 2006/0262587 | * | 9/2006 |
| JP | 2006/262587 | * | 9/2006 |
| JP | 2006262587 A | | 9/2006 |
| WO | WO 2010/134224 A1 | * | 11/2010 |

* cited by examiner

CONTROL DEVICE FOR VEHICLE

CROSS REFERENCE TO RELATED APPLICATION

This is a national phase application based on the PCT International Patent Application No. PCT/JP2011/052109 filed on Feb. 2, 2011, the entire contents of which are incorporated herein by reference.

TECHNICAL FIELD

The present invention relates to the control of a hybrid vehicle that can run with the power of at least an internal combustion engine and a rotating electric machine.

BACKGROUND ART

Japanese Patent. Laying-Open No. 2002-225578 (PTL 1) discloses a hybrid vehicle including an engine and first and second motor generators (MG) as the driving power source, having the engine and the first MG coupled to an output shaft via a planetary gear mechanism, and the second MG coupled to the output shaft via a transmission.

CITATION LIST

Patent Literature

PTL 1: Japanese Patent Laying-Open No. 2002-225578
PTL 2: Japanese Patent Laying-Open No. 2006-220225
PTL 3: Japanese Patent Laying-Open No. 2005-313865
PTL 4: Japanese Patent Laying-Open No. 2001-206088

SUMMARY OF INVENTION

Technical Problem

In the case where an error occurs at a transmission device including a planetary gear mechanism and a transmission in the vehicle disclosed in PTL 1, it is desirable to stop the engine and cut power supply from a high-voltage battery that stores electric power for driving first and second MGs at the point of time when a determination is made that the vehicle has stopped. However, when a vehicle-stop determination is made based on the vehicle speed obtained based on the rotational speed of at least one of the engine, the first MG, and the second MG, a vehicle-stop state may be determined erroneously due to an error in the transmission device. If electric power supply from the high-voltage battery is cut based on such an erroneous determination, there is a possibility of the auxiliary device (for example, electric power steering system, or the like) not being able to operate although the vehicle is currently running.

In view of the foregoing, an object of the present invention is to allow connection of a high-voltage battery (operation of the auxiliary device) during running to be continued more reliably by determining a stop state of the vehicle more accurately when there is an error at the transmission device.

Solution to Problem

A control device according to the present invention controls a vehicle. The vehicle includes a wheel including at least a driving wheel; an output shaft coupled to the driving wheel; a power generation device including an internal combustion engine, a first rotating electric machine and a second rotating electric machine driven by electric power supplied from a power storage device through a power line, and generating driving power for rotating the output shaft; a transmission device including a planetary gear mechanism provided between the internal combustion engine, the first rotating electric machine, and the output shaft, and a transmission provided between the second rotating electric machine and the output shaft; and an open/close device opening and closing a conduction path between the power storage device and the power line. The control device includes a stop unit for stopping an operation of the power generation device when the transmission device is in error, a determination unit determining, after the operation of the power generation device is stopped, whether rotation of the wheel has stopped or not, and a control unit maintaining the open/close device at a closed state until the determination unit determines that rotation of the vehicle has stopped, after the operation of the power generation device has been stopped, and switching the open/close device to an open state when the determination unit determines that the rotation of the wheel has stopped.

Preferably, the vehicle further includes a first rotational speed sensor detecting the rotational speed of the wheel, or a second rotational speed sensor detecting the rotational speed of the output shaft. The determination unit determines that the rotation of the wheel has stopped when a detection value of the first rotational speed sensor or the second rotational speed sensor is lower than a predetermined value.

Preferably, the vehicle further includes a parking lock mechanism for prohibiting rotation of the wheel. When the first rotational speed sensor or second rotational speed sensor is in error, the determination unit determines that the vehicle has stopped in a case where rotation of the wheel is prohibited by the parking lock mechanism.

Preferably, the vehicle further includes an electrically powered type auxiliary device connected to the power line. The control unit maintains the auxiliary device at an operable state by maintaining the open/close device at a closed state until the determination unit determines that the rotation of the wheel has stopped, after operation of the power generation device has stopped.

Preferably, the auxiliary device includes at least one of a steering device controlling vehicle steering and a braking device for controlling a braking force of the vehicle.

Preferably, the vehicle further includes a mechanical oil pump operated by the power of the internal combustion engine. The transmission uses the oil pressure from the mechanical oil pump to fixedly set the gear ratio of the second rotating electric machine to the output shaft at any of a plurality of gear ratios.

Advantageous Effects of Invention

According to the present invention, a stop state of the vehicle can be determined more accurately when the transmission device is in error to allow supply of electric power from a power storage device during running (operation of auxiliary device) to be continued more reliably.

DESCRIPTION OF EMBODIMENTS

Figure 1:
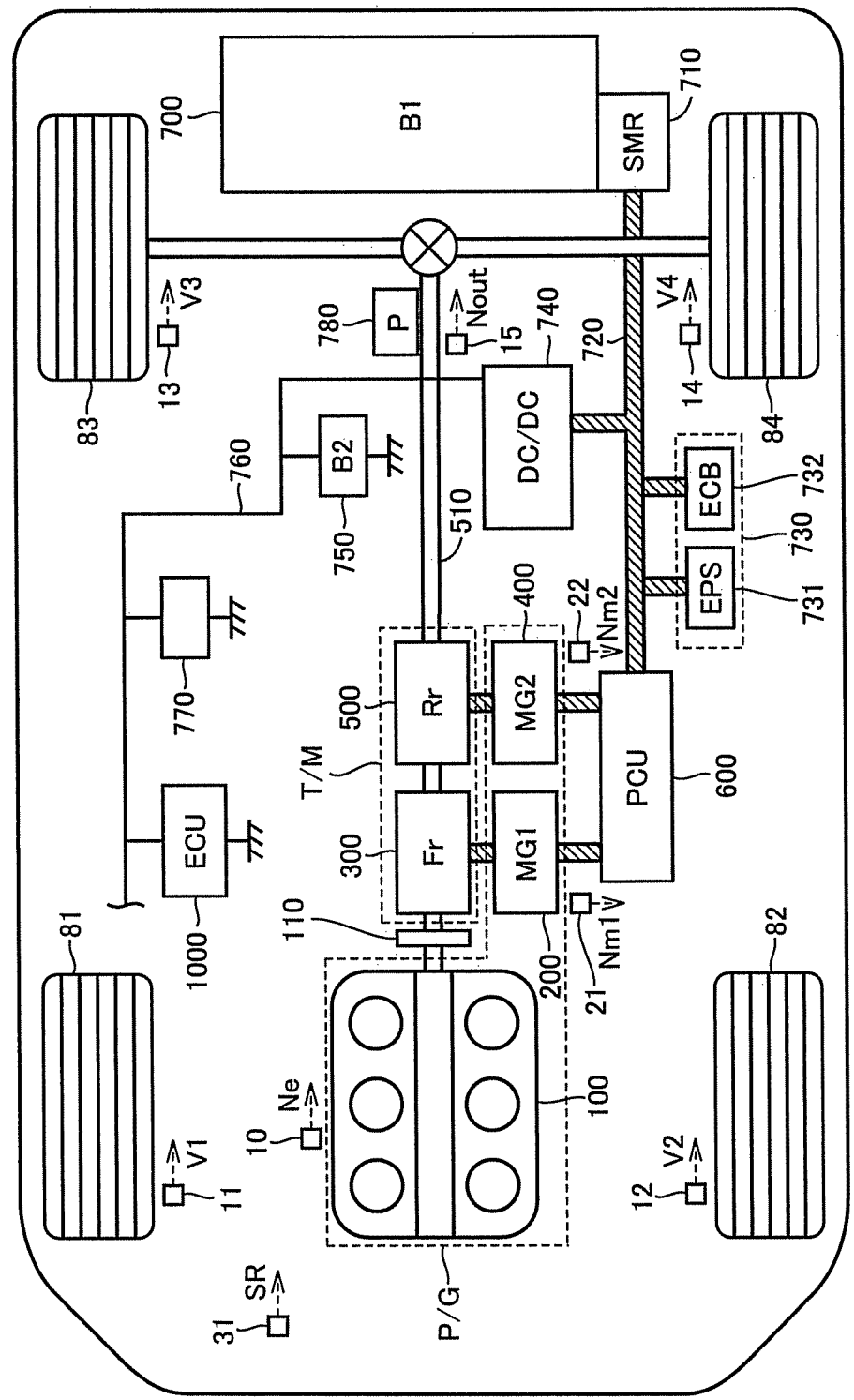
FIG. 1 is an entire block diagram of a vehicle.

Embodiments of the present invention will be described hereinafter with reference to the drawings. In the following description, the same components have the same reference characters allotted. Their designations and functions are also identical. Therefore, detailed description thereof will not be repeated.

FIG. 1 is an entire block diagram of a vehicle 1 incorporating a control device according to an embodiment. Vehicle 1 is a hybrid vehicle with a driving power generation device P/G including an engine 100, a first motor generator (MG) 200 and a second MG 400 as the driving power source.

Vehicle 1 includes left and right wheels of the front side (driven wheels) 81 and 82, left and right wheels of the rear side (driving wheels) 83 and 84, an engine 100, a damper 110, a first MG 200, a power split mechanism 300, a second MG 400, a transmission 500, a propeller shaft (output shaft 510), a PCU (Power Control Unit) 600, a first battery 700, an SMR (System Main Relay) 710, a power cable 720, a first auxiliary device 730, a DC/DC converter 740, a second battery 750, a power line 760, a second auxiliary device 770, a parking lock mechanism 780, and an ECU (Electronic Control Unit) 1000.

Engine 100 is an internal combustion engine burning fuel to output power. The power of engine 100 is applied to power split mechanism 300 via damper 110.

Power split mechanism 300 splits the power applied from engine 100 into the power towards propeller shaft 510 and the power towards first MG 200.

First and second MGs 200 and 400 are alternating rotating electric machines, functioning as an electric motor (motor) and also as a power generator (generator). The power of second MG 400 is applied to transmission 500.

Transmission 500 changes the rotational speed of second MG 400 for transmission to propeller shaft 510.

Propeller shaft 510 rotates by at least the power of engine 100 transmitted via power split mechanism 300 and the power of second MG 400 transmitted via transmission 500. The rotational force of propeller shaft 510 is divided to the left and right drive shafts via a differential gear. Accordingly, wheels 83 and 84 rotate to cause vehicle 1 to run.

PCU 600 converts the DC power of the high voltage supplied from first battery 700 via power cable 720 into AC power for output to first MG 200 and/or second MG 400. Accordingly, first MG 200 and/or second MG 400 is driven. PCU 600 also converts the AC power generated by first MG 200 and/or second MG 400 into DC power for output to first battery 700. Accordingly, first battery 700 is charged.

First battery 700 is a second battery storing the DC power of high voltage (for example, approximately 200 V) to drive first MG 200 and/or second MG 400. First battery 700 is formed typically including nickel-metal hydride or lithium ions. A capacitor of large capacitance may be employed instead of first battery 700.

SMR 710 is a relay to open/close the connection path between first battery 700 and power cable 720.

First auxiliary device 730 is auxiliary machinery operating with the electric power of high voltage supplied from first battery 700 via power cable 720. First auxiliary device 730 includes an electric power steering system (hereinafter, referred to as EPS) 731, and an electronically controlled brake system (hereinafter, referred to as ECB) 732. ECB 732 may be included in a second auxiliary device 770 (low-voltage system).

DC/DC converter 740 converts the high voltage supplied from first battery 700 via power cable 720 into a low voltage that can be used for charging second battery 750, and supplies the converted voltage to the low-voltage system via power line 760. The low voltage system is the generic designation of equipment operating at low voltage. The low voltage system includes second auxiliary device 770, ECU 1000, and the like.

Second battery 750 is a secondary battery also termed an auxiliary battery, storing DC power of low voltage to operate the low voltage system. Second battery 750 is formed typically including a lead battery.

Second auxiliary device 770 is auxiliary machinery operating with the power of low voltage supplied from second battery 750 or DC/DC converter 740. Second auxiliary device 770 includes, for example, electric load such as an air conditioner unit, lamp apparatus, wiper, heater, and the like not shown.

Parking lock mechanism 780 is a device for mechanically prohibiting rotation of propeller shaft 510 when vehicle 1 is stopped or the like to maintain a stopped state.

An engine rotational speed sensor 10, wheel speed sensors 11-14, an output shaft rotational speed sensor 15, resolvers 21 and 22, a shift range sensor 31, and the like are connected to ECU 1000.

Engine rotational speed sensor 10 detects the rotational speed (engine rotational speed) Ne of the crankshaft of engine 100. Wheel speed sensors 11-14 detect the rotational speed (wheel speed) V1-V4 of wheels 81-84, respectively. Output shaft rotational speed sensor 15 detects the rotational speed of propeller shaft 510 (output shaft rotational speed) Nout. Resolvers 21 and 22 detect the rotational speed of first MG 200 (first MG rotational speed) Nm1, and the rotational speed of second MG 400 (second MG rotational speed) Nm2. Shift range sensor 31 detects a shift range SR. Shift range SR is switched to a D (drive) range, N (neutral) range, R (reverse) range, P (parking) range, and the like through the user's manipulation. When shift range SR is at the P range, parking lock mechanism 780 is activated to mechanically prohibit propeller shaft 510 from rotating (that is, prohibit wheels 83 and 84 from rotating).

ECU 1000 includes a CPU (Central Processing Unit) and a memory not shown to execute predetermined operation processing based on information stored in the memory and information from each sensor. ECU 1000 controls each device incorporated in vehicle 1 based on the result of the operation processing.

Figure 2:
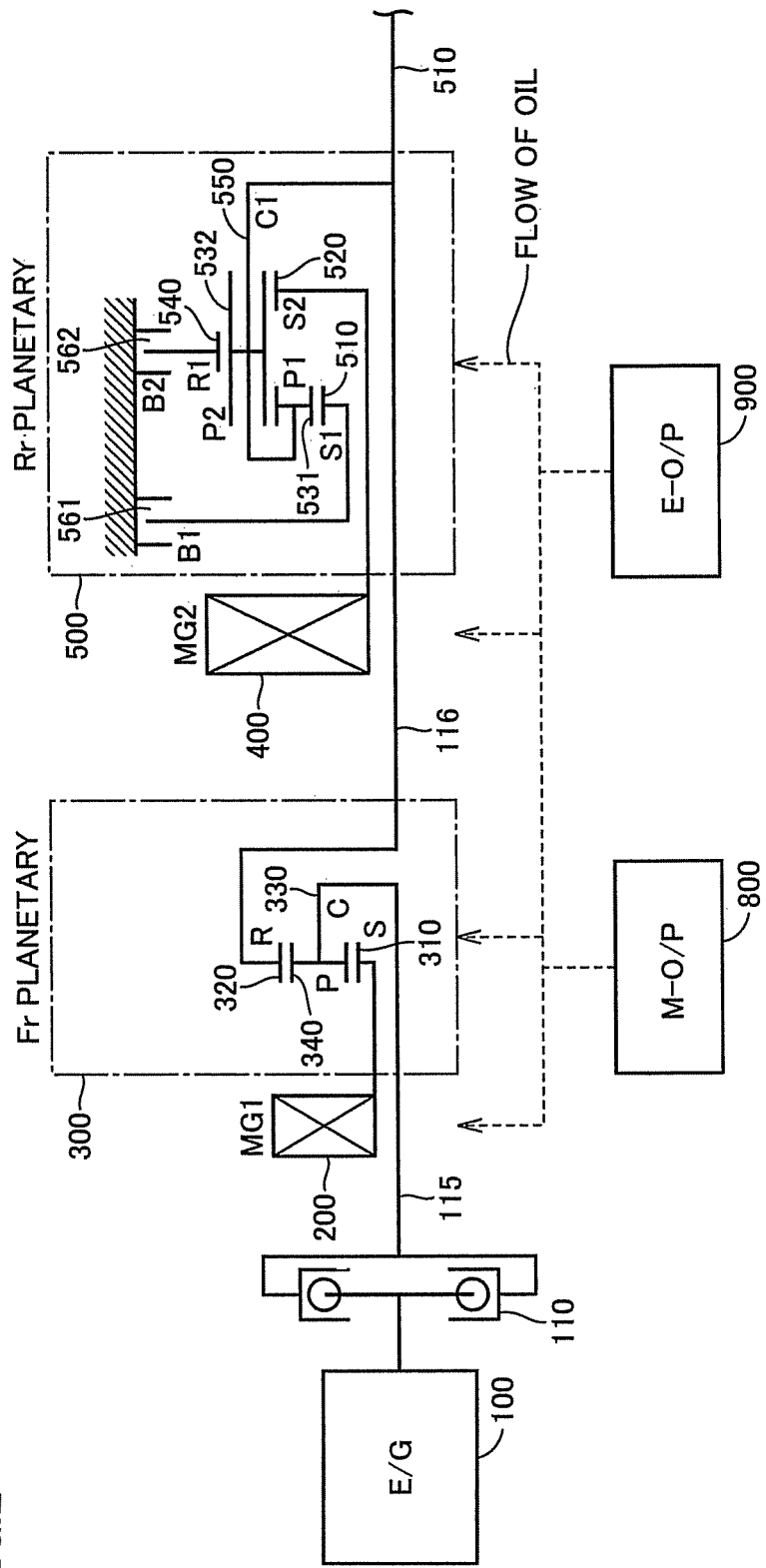
FIG. 2 schematically represents the connecting relationship of an engine, a first MG, a power split mechanism, a second MG, and a transmission.

FIG. 2 schematically represents the connecting relationship of engine 100, first MG 200, power split mechanism 300, second MG 400, and transmission 500.

Power split mechanism 300 is a planetary gear mechanism including a sun gear (S) 310, a ring gear (R) 320, a pinion gear (P) 340 that meshes with sun gear (S) 310 and ring gear (R) 320, and a carrier (C) 330 holding pinion gear (P) 340 rotatably on its axis and in orbital motion.

Carrier (C) 330 is coupled to the crankshaft of engine 100 via first rotational shaft 115 and damper 110. Sun gear (S) 310 is coupled to the rotor of first MG 200. Ring gear (R) 320 is coupled to propeller shaft 510 via second rotational shaft 116.

Transmission 500 is formed of a Ravigneaux planetary gear set. Specifically, transmission 500 includes a first sun gear (S1) 510, a second sun gear (S2) 520, a first pinion (P1) 531 meshing with first sun gear (S1) 510, a second pinion (P2) 532 meshing with first pinion (P1) 531 and second sun gear (S2) 520, a ring gear (R1) 540 meshing with second pinion (P2) 532, and a carrier (C1) 550 holding each of pinions 531 and 532 rotatably on its own axis and in orbital motion. Therefore, first sun gear (S1) 510 and ring gear (R1) 540 constitute, together with each of pinions 531 and 532, a set corresponding to a double pinion planetary gear mechanism. Second sun gear (S2) 520 and ring gear (R1) 540 constitute, together with second pinion (P2) 532, a set corresponding to a single pinion type planetary gear mechanism.

Carrier (C1) 550 is coupled to propeller shaft 510. Second sun gear (S) 520 is coupled to the rotor of second MG 400.

Transmission 500 is provided with a B1 brake 561 selectively fixing first sun gear (S1) 510, and a B2 brake 562 selectively fixing ring gear (R1) 540.

B1 brake 561 is a multi disc type engagement device generating engagement force by the frictional force of the friction member fixed to the case side of transmission 500 and the friction member fixed to the side of first sun gear (S1) 510. B2 brake 562 is a multi disc type engagement device generating engagement force by the frictional force of the friction member fixed to the case side of transmission 500 and the friction member fixed to the side of ring gear (R1) 540. These brakes 561 and 562 are wet type engagement devices to be engaged and disengaged with oil constantly lubricated between the friction members.

These brakes 561 and 562 are connected to a transmission hydraulic circuit (not shown) providing oil pressure according to a control signal from ECU 1000 to be engaged and disengaged by the oil pressure output from the transmission hydraulic circuit.

In the case where B1 brake 561 is engaged to fix first sun gear (S1) 510 and B2 brake 562 is released to not fix ring gear (R1) 540, the shift of transmission 500 attains high gear H.

In the case where B2 brake 562 is engaged to fix ring gear (R1) 540 and B1 brake 561 is released to not fix first sun gear (S1) 510, the shift of transmission 500 attains low gear L where the transmission ratio is greater than that of high gear H.

Thus, power split mechanism 300 and transmission 500 are both constituted including a planetary gear. Power split mechanism 300 and transmission 500 are also referred to as "Fr planetary" and "Rr planetary", respectively, by their arrangement at the front side and rear side of vehicle 1. Power split mechanism 300 and transmission 500 function to alter the rotational speed of engine 100 and second MG 400, respectively, for output to propeller shaft 510. Therefore, power split mechanism 300 and transmission 500 together will also be termed "transmission device T/M" hereinafter (refer to FIG. 1).

Vehicle 1 has mechanical oil pump 800 and electric-powered oil pump 900 provided in parallel for supplying oil serving as a lubricant and coolant towards each component of first MG 200, second MG 400, and transmission device T/M (power split mechanism 300 and transmission 500).

Mechanical oil pump 800 draws up oil stored in an oil pan (not shown) by the driving power of engine 100 to supply the drawn oil to each component.

Electric-powered oil pump 900 draws up oil stored in an oil pan by the driving power of the motor under control of a control signal from ECU 1000 to supply the drawn oil to each component.

The oil from mechanical oil pump 800 and electric-powered oil pump 900 is also supplied to the aforementioned transmission hydraulic circuit to be used as the pressure at the source of the operating oil of transmission 500 (operating oil of B1 brake 561 and B2 brake 562).

Figure 3:
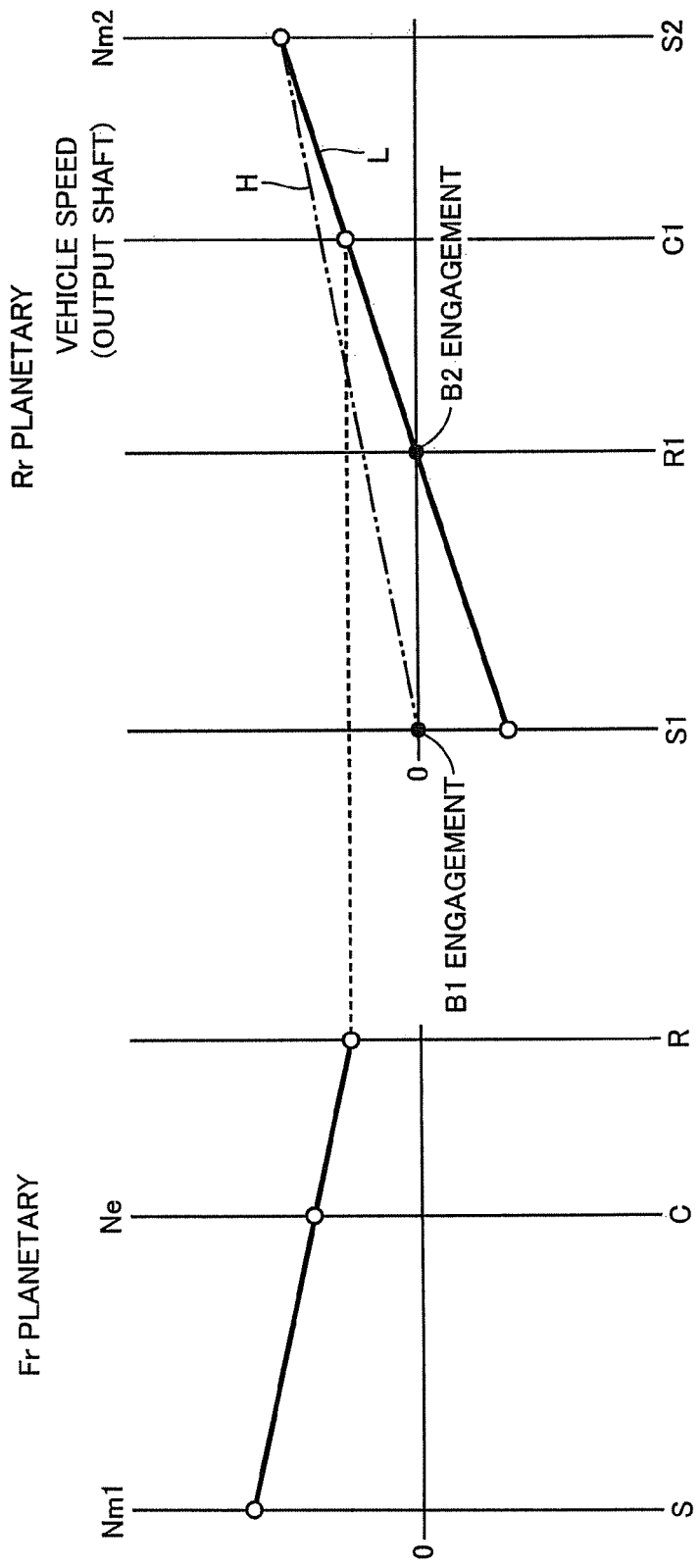
FIG. 3 represents a nomographic chart of a transmission device T/M working properly.

FIG. 3 represents a nomographic chart of transmission device T/M (power split mechanism 300 and transmission 500) working properly.

When power split mechanism 300 (Fr planetary) operates properly, first MG rotational speed Nm1, engine rotational speed Ne, and the rotational speed of ring gear (R) 320 take the relationship connected by a straight line on the nomographic chart of power split mechanism 300 (the relationship in which a rotational speed can be determined if the remaining two rotational speeds are determined). Therefore, the nomographic chart of power split mechanism 300 can be used to obtain the rotational speed of ring gear (R) 320 based on engine rotational speed Ne and first MG rotational speed Nm1. Since ring gear (R) 320 is connected to propeller shaft 510 (output shaft) via second rotational shaft 116, the obtained rotational speed of ring gear (R) 320 will correspond to the vehicle speed. The rotational speed of ring gear (R) 320 obtained based on engine rotational speed Ne and first MG rotational speed Nm1 using the nomographic chart of power split mechanism 300 (Fr planetary) is also referred to as "vehicle speed Vfr".

When transmission 500 (Rr planetary) operates properly, the rotational speed of first sun gear (S1) 510, ring gear (R1) 540 and carrier (C1) 550 take a relationship connected by a straight line on the nomographic chart of transmission 500 (the relationship in which a rotational speed can be determined if the remaining two rotational speeds are determined).

Since B2 brake 562 is engaged to fix ring gear (R1) 540 at low gear L, the rotational speed of ring gear (R1) 540 becomes 0. Since B1 brake 561 is engaged to fix first sun gear (S1) 510 at high gear H, the rotational speed of first sun gear (S1) 510 becomes 0. Therefore, the nomographic chart of transmission 500 can be used to obtain the rotational speed of carrier (C1) 550 based on second MG rotational speed Nm2. Since carrier (C1) 550 is coupled to propeller shaft 510 (output shaft), the obtained value of the rotational speed of carrier (C1) 550 corresponds to the vehicle speed. Hereinafter, the rotational speed of carrier (C1) 550 obtained based on second MG rotational speed Nm2 using the nomographic chart of transmission 500 (Rr planetary) is also referred to as "vehicle speed Vrr".

At vehicle 1 having the configuration set forth above, ECU 1000 determines whether there is an error at transmission device T/M during running of vehicle 1, and causes vehicle 1 to run in a fail safe mode when there is an error at transmission device T/M.

Figure 4:
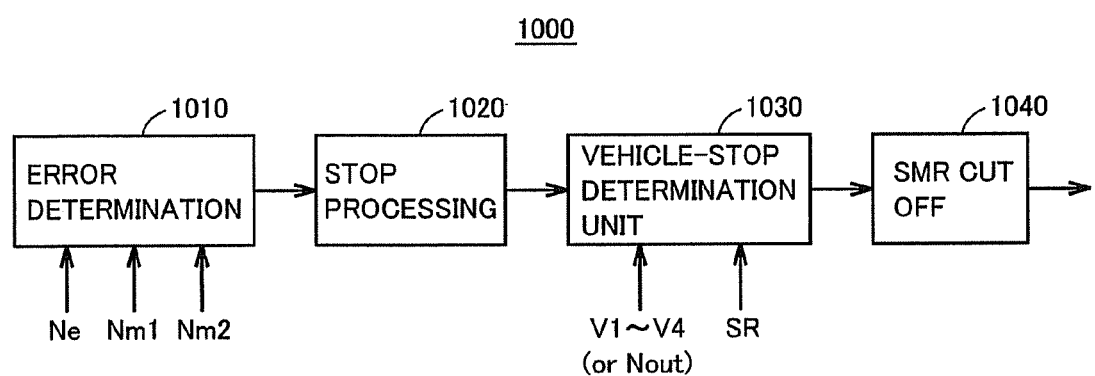
FIG. 4 is a functional block diagram of an ECU.

FIG. 4 is a functional block diagram of the part of ECU 1000 related to fail safe running at the time of error in transmission device T/M. Each functional block shown in FIG. 4 may be realized by hardware or by software.

ECU 1000 includes an error determination unit 1010, a stop processing unit 1020, a stop determination unit 1030, and an SMR cut-off unit 1040.

Error determination unit 1010 determines whether transmission device T/M is in error or not. An error state of transmission device T/M implies a state in which the relationship of the nomographic chart shown in FIG. 3 is not satisfied due to a malfunction at any section in transmission device T/M. For example, error determination unit 1010 uses the nomographic chart of power split mechanism 300 to obtain vehicle speed Vfr from engine rotational speed Ne and first MG rotational speed Nm1, and uses the nomographic chart of transmission 500 to obtain vehicle speed Vrr from second MG rotational speed Nm2. Error determination unit 1010 then compares vehicle speed Vfr with vehicle speed Vrr to determine that transmission device T/M is working properly when both match and determine that transmission device T/M is in error when they do not match. Whether transmission device T/M is in error or not may be determined by another arbitrary method.

Stop processing unit 1020 carries out stop processing to stop the operation of driving power generation device P/G when a determination is made that transmission device T/M is in error. Specifically, stop processing unit 1020 stops the supply of fuel to engine 100 and also stops the operation of PCU 600. Accordingly, the output torque of engine 100, first MG 200, and second MG 400 all become zero to stop the generation of the driving power of vehicle 1. Therefore, vehicle 1 attains a state running by inertia.

Vehicle-stop determination unit 1030 carries out vehicle-stop determination processing to determine whether vehicle 1 has actually stopped or not subsequent to the stop processing. This vehicle-stop determination processing is carried out based on, not vehicle speed Vfr or vehicle speed Vrr, but wheel speeds V1-V4 or shift range SR. This is the most characteristic feature in the present embodiment, and will be described in detail afterwards.

SMR cut-off unit 1040 maintains SMR 710 at a closed state until vehicle-stop determination unit 1030 determines that vehicle 1 has actually stopped after the stop processing. Accordingly, the supply of electric power from first battery 700 to power cable 720 is maintained, allowing first auxiliary device 730 (EPS 731, ECB 732) and/or DC/DC converter 740 to be maintained at an operable state. In contrast, when vehicle-stop determination unit 1030 determines that vehicle 1 has actually stopped, SMR cut-off unit 1040 opens SMR 710. Accordingly, the supply of electric power from first battery 700 to power cable 720 is cut off, preventing leakage of electricity outwards from first battery 700.

Figure 5:
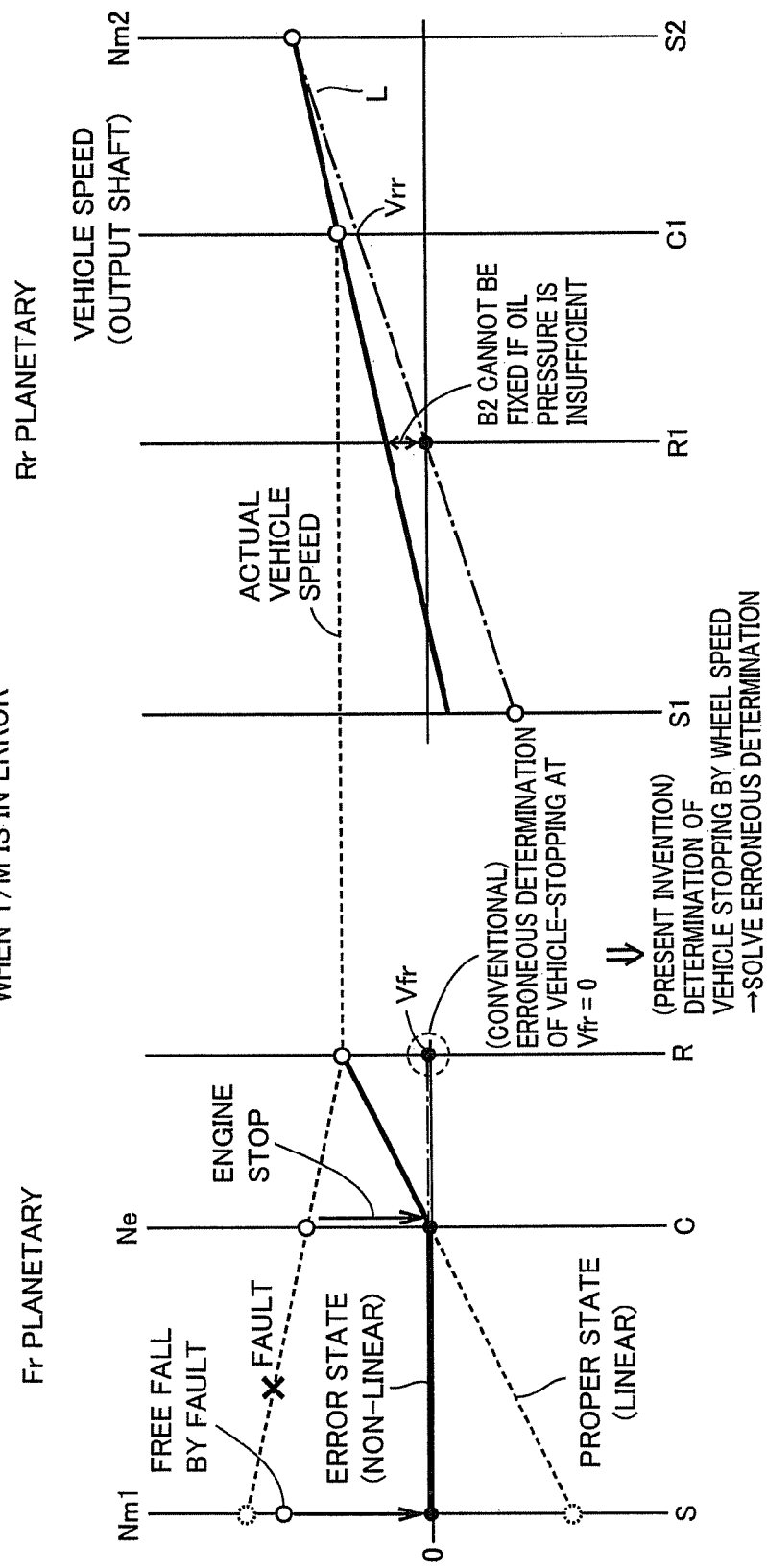
FIG. 5 represents a nomographic chart of transmission device T/M in error.

FIG. 5 represents a nomograph chart when transmission device T/M is in error. FIG. 5 corresponds to the case where there is a free fault at the Fr planetary. A free fault at the Fr planetary is one of the errors at transmission device T/M, in which the relation of the nomographic chart of power split mechanism 300 (Fr planetary) is no longer satisfied.

At the time of a free fault at the Fr planetary, the first MG and the engine rotate (freely) independent of each other due to the fault of first rotational shaft 115 or the like, so that the relationship of first MG rotational speed Nm1 and engine rotational speed Ne in the nomographic chart of power split mechanism 300 is no longer satisfied. Therefore, at the time of a free fault at the Fr planetary, vehicle speed Vfr obtained from engine rotational speed Ne and first MG rotational speed Nm1 will no longer match the actual rotational speed of ring gear (R) 320. Therefore, vehicle Vfr will also not match vehicle speed Vrr obtained from second MG rotational speed Nm2. When vehicle speed Vfr and vehicle speed Vrr do not match, as in such a case, ECU 1000 determines that transmission device T/M is in error, and stops engine 100, first MG 200 and second MG 400 by the stop processing.

Vehicle 1 runs by inertia for a while after the stop processing. Therefore, until vehicle 1 actually stops, SMR 710 must be maintained at a closed state to allow first auxiliary device 730 (EPS 731, ECB 732) and/or DC/DC converter 740 to be maintained in an operable state.

Conventionally, the determination as to whether vehicle 1 has actually stopped or not after the stop processing was made based on vehicle speed Vfr or vehicle speed Vrr. However, there is a possibility of erroneous determination of vehicle stopping by the conventional determination.

Specifically, mechanical oil pump 800 is stopped in accordance with engine 100 being stopped subsequent to the stop processing, so that the oil pressure required for transmission 500 will be insufficient. Accordingly, B1 brake 561 or B2 brake 562 cannot be fixed, as shown in FIG. 5, leading to the case where the nomographic chart of transmission 500 is not satisfied. Thus, vehicle speed Vrr obtained from second MG rotational speed Nm2 will not match the actual vehicle speed.

At the time of a free fault at the Fr planetary, the first MG and the engine rotate such that first MG rotational speed Nm1 and engine rotational speed Ne are independent of each other. Therefore, when engine 100 is stopped and engine rotational speed Ne becomes zero and first MG rotational speed Nm1 is reduced to 0 by free falling, vehicle speed Vfr will become zero although vehicle 1 is still running by inertia, which may cause an erroneous determination of the vehicle being stopped. If SMR 710 opens by such an erroneous determination, the inconvenience of the steering operation using EPS 731 or the braking operation using ECB 732 during inertia running being disabled may occur.

To prevent such inconvenience, ECU 1000 (vehicle-stop determination unit 1030) of the present embodiment determines whether vehicle 1 has actually stopped or not based on, not vehicle speed Vfr or vehicle speed Vrr, but whether wheel speeds V1-V4 more closer to the actual vehicle speed have dropped to substantially zero (when wheel speed sensors 11-14 are in error, whether shift range SR is at P range or not). Accordingly, a determination as to whether vehicle 1 has actually stopped or not can be made more accurately at the time of a free fault at the Fr planetary, allowing the operation of first auxiliary device 730 (EPS 731, ECB 732) and DC/DC converter 740 (operation of second auxiliary device 770) during inertia running to be continued more reliably. This is the most characteristic feature in the present embodiment.

Figure 6:
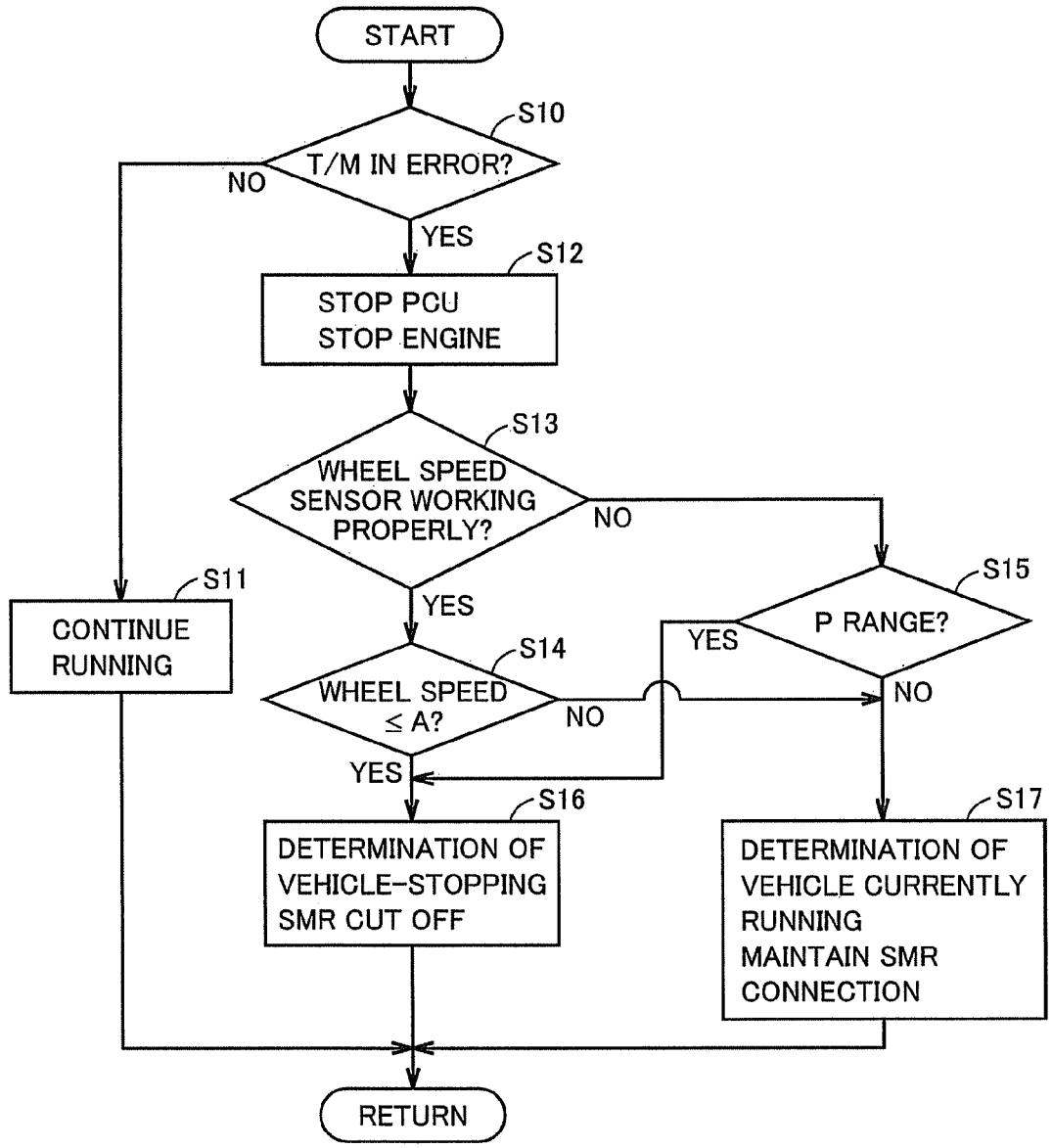
FIG. 6 is a flowchart of the processing procedure of the ECU.

FIG. 6 is a flowchart of the processing procedure of ECU 1000 to realize the function set forth above. The flow chart of FIG. 6 is repeatedly executed at a predetermined cycle during running of vehicle 1.

At step (hereinafter, step abbreviated as "S") 10, ECU 1000 determines whether transmission device T/M is in error or not.

When transmission device T/M is working properly (NO at S10), ECU 1000 proceeds to S11 to continue the running of vehicle 1.

In contrast, when transmission device T/M is in error (YES at S10), ECU 1000 proceeds to S12 to carry out the stop processing. Specifically, ECU 1000 stops PCU 600 (stops first MG 200 and second MG 400), and also engine 100.

Subsequent to the stop processing, ECU 1000 determines whether wheel speed sensors 11-14 are working properly or not. The determination is made by, for example, whether the difference between the maximum value and minimum value among wheel speeds V1-V4 detected at wheel speed sensors 11-14, respectively, is small (equal to or below a predetermined value) or not, or by whether all of wheel speeds V1-V4 indicate a value within standards.

When wheel speed sensors 11-14 work properly (YES at S13), ECU 1000 proceeds to S14 to determine whether the wheel speed is less than or equal to a threshold speed A (whether the wheel speed is substantially zero or not). The wheel speed to be compared with threshold speed A in the processing may be the maximum value among wheel speeds V1-V4 or the average of wheel speeds V1-V4.

When the wheel speed is higher than the threshold speed A (NO at S14), ECU 1000 proceeds to S17, determining that vehicle 1 is currently running by inertia, and maintains SMR 710 at a closed state. Accordingly, first auxiliary device 730 (EPS 731, ECB 732) and/or DC/DC converter 740 is maintained at an operable state.

When the wheel speed is less than or equal to threshold speed A (YES at S14), ECU 1000 proceeds to S16 to determine that vehicle 1 has stopped and causes SMR 710 to open to cut off the high voltage. Accordingly, the leakage of electricity outwards from first battery 700 is prevented.

When wheel speed sensors 11-14 are in error (NO at S13), ECU 1000 proceeds to S15 to determine whether shift range SR is at the P range or not.

When shift range SR is not at the P range (NO at S15), ECU 1000 proceeds to S17 to determine that vehicle 1 is currently running by inertia, since it is indefinite as to whether vehicle 1 is stopped or not, and maintains the connection of SMR 710.

When the shift range SR is at the P range (YES at S15), it is strongly presumed that vehicle 1 is in a state where the rotation of wheels 83 and 84 is prohibited by parking lock mechanism 780, and vehicle 1 is stopped. Therefore, ECU 1000 proceeds to S16 to determine that vehicle 1 is stopped, and causes SMR 710 to open to cut off the high voltage.

Thus, when transmission device T/M is in error, ECU 1000 of the present embodiment causes driving power generation device P/G to stop. Then, ECU 1000 carries out vehicle-stop determination processing based on, not vehicle speed Vfr obtained from Ne and Nm1 or vehicle speed Vfr obtained from Nm2, but the detection values of wheel speed sensors 11-14 that are more close to the actual vehicle speed (when wheel speed sensors 11-14 are in error, the shift range SR). Accordingly, the determination as to whether vehicle 1 is actually stopped or not can be made more accurately, allowing the operation of first auxiliary device 730 (EPS 731, ECB 732) and DC/DC converter 740 during inertia running to be continued more reliably.

Although the present embodiment has been described based on the case where vehicle-stop determination processing is carried out based on the detection values from wheel speed sensors 11-14, the vehicle-stop determination processing may be carried out based on the detection value from output shaft rotational speed sensor 15 that detects the rotational speed of propeller shaft 510 mechanically coupled to wheels 83 and 84.

It should be understood that the embodiments disclosed herein are illustrative and non-restrictive in every respect. The scope of the present invention is defined by the terms of the claims, rather than the description above, and is intended to include any modification within the scope and meaning equivalent to the terms of the claims.

REFERENCE SIGNS LIST 1 vehicle; 10 engine rotational speed sensor; 11-14 wheel speed sensor; 15 output shaft rotational speed sensor; 21, 22 resolver; 31 shift position sensor; 81-84 wheel; 100 engine; 110 damper; 115 first rotational shaft; 116 second rotational shaft; 200 first MG; 300 power split mechanism; 400 second MG; 500 transmission; 510 propeller shaft; 561 B1 brake; 562 B2 brake; 700 first battery; 720 power cable; 730 first auxiliary device; 731 EPC; 732 ECB; 740 converter; 750 second battery; 760 power line; 770 second auxiliary device; 780 parking lock mechanism; 800 mechanical oil pump; 900 electric-powered oil pump; 1000 ECU; 1010 error determination unit; 1020 stop processing unit; 1030 vehicle-stop determination unit; 1040 SMR cut-off unit.

The invention claimed is:

1. A control device for a vehicle, said vehicle including
a wheel including at least a driving wheel,
an output shaft coupled to said driving wheel,
a power generation device including an internal combustion engine, a first rotating electric machine and a second rotating electric machine driven by electric power supplied from a power storage device via a power line for generating driving power to rotate said output shaft,
a transmission device including a planetary gear mechanism having a first rotational element connected to said internal combustion engine, a second rotational element connected to said first rotating electric machine and a third rotational element connected to said output shaft, and a transmission provided between said second rotating electric machine and said output shaft, and
an open/close device for opening and closing a conduction path between said power storage device and said power line,
said control device comprising an electronic control unit having a central processing unit and memory, the electronic control unit further comprising:
a stop unit stopping an operation of said power generation device when said first rotating electric machine is disconnected from said internal combustion engine due to a malfunction of said planetary gear mechanism, wherein the operation is the generation of driving power to the vehicle,
a determination unit determining whether rotation of said wheel has stopped or not after the operation of said power generation device is stopped, and
a control unit maintaining said open/close device at a closed state until said determination unit determines that rotation of said wheel has stopped, after operation of said power generation device is stopped, and switching said open/close device to an open state when said determination unit determines that rotation of said wheel has stopped.

2. The control device for a vehicle according to claim 1, said vehicle further including a first rotational speed sensor for detecting a rotational speed of said wheel, or a second rotational speed sensor for detecting a rotational speed of said output shaft,
wherein said determination unit determines that rotation of said wheel has stopped when a detection value of said first rotational speed sensor or a detection value of said second rotational speed sensor is lower than a predetermined value.

3. The control device for a vehicle according to claim 2, said vehicle further including a parking lock mechanism for prohibiting rotation of said wheel,
wherein said determination unit determines, when said rotational speed sensor is in error, that said vehicle has stopped in a case where rotation of said wheel is prohibited by said parking lock mechanism.

4. The control device for a vehicle according to claim 1, said vehicle further including an electrically powered auxiliary device connected to said power line,
wherein said control unit maintains said auxiliary device at an operable state by maintaining said open/close device at a closed state until said determination unit determines that rotation of said wheel is stopped, after operation of said power generation device is stopped.

5. The control device for a vehicle according to claim 4, said auxiliary device including at least one of a steering device controlling steering of said vehicle, and a braking device controlling a braking force of said vehicle.

6. The control device for a vehicle according to claim 1, said vehicle further including a mechanical oil pump operated by power of said internal combustion engine,
wherein said transmission uses oil pressure from said mechanical oil pump to fix a gear ratio of said second rotating electric machine to said output shaft to any one of a plurality of gear ratios.

* * * * *